US010185984B2

(12) United States Patent
Shaffer et al.

(10) Patent No.: US 10,185,984 B2
(45) Date of Patent: Jan. 22, 2019

(54) DELIVERY OF REMOTELY ORDERED ITEMS TO THE CURRENT LOCATION OF A USER WHEN GEOGRAPHIC INFORMATION INDICATES THAT THE USER IS WITHIN A PREDETERMINED AREA ASSOCIATED WITH A PHYSICAL STORE

(71) Applicant: Walmart Apollo, LLC, Bentonville, AR (US)

(72) Inventors: Jason D. Shaffer, Rogers, AR (US); Rachael Ulman, New York, NY (US); Richard Ramsden, Foster City, CA (US); David Jon Carr, Mountain View, CA (US); Mark J. Valentine, Bentonville, AR (US); Corey L. Peach, Bella Vista, AR (US); Kevin A. Ruehle, Rogers, AR (US); David G. Tovey, Rogers, AR (US); Todd W. Franke, Bentonville, AR (US); Timothy James Burleson, Bentonville, AR (US); Danielle McPherson, Springdale, AR (US); Kuleni Gebisa, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 602 days.

(21) Appl. No.: 14/828,245

(22) Filed: Aug. 17, 2015

(65) Prior Publication Data

US 2016/0063604 A1     Mar. 3, 2016

Related U.S. Application Data

(60) Provisional application No. 62/044,837, filed on Sep. 2, 2014.

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06F 17/3087* (2013.01); *G06F 17/30241* (2013.01);
(Continued)

(58) Field of Classification Search
CPC .... G06Q 30/06–30/0645; G06Q 30/08; G06Q 50/01
See application file for complete search history.

(56) References Cited

U.S. PATENT DOCUMENTS

2002/0026380 A1* 2/2002 Su ........................ G06Q 30/06
705/26.8
2002/0143655 A1 10/2002 Elston et al.
(Continued)

OTHER PUBLICATIONS

IBM, "Method and Apparatus for Online Shopping with in Store Pickup and Payment," IP.com Prior Art Database Technical Disclosure No. IPCOM000010644D, Jan. 2, 2003, 5pp. (Year: 2003).*

*Primary Examiner* — Adam L Levine
(74) *Attorney, Agent, or Firm* — Schmeiser, Olsen & Watts LLP

(57) ABSTRACT

Embodiments of a computer-implemented method and system pertaining to drive through grocery pickup are described. In one example, a computer-implemented method receives geographic information about a user. The geographic information indicates that the user is within a predetermined area associated with the physical store. The method also determines whether there is a pending remotely placed order for a user account associated with the user in a database associated with the physical store. In response to a determination that there is the pending remotely placed order for the user account associated with the user in the
(Continued)

database, the method transmits order information to a computing device of the physical store. The order information includes one or more items in the pending remotely placed order. The method also determines a current location of the user. The method further causes a delivery of the one or more items to the current location.

20 Claims, 12 Drawing Sheets

(51) Int. Cl.
    *G06F 17/30*     (2006.01)
    *G06Q 30/02*     (2012.01)
    *G06Q 30/04*     (2012.01)
    *H04W 4/021*     (2018.01)

(52) U.S. Cl.
    CPC ..... *G06Q 30/0259* (2013.01); *G06Q 30/0261* (2013.01); *G06Q 30/0267* (2013.01); *G06Q 30/04* (2013.01); *G06Q 30/0635* (2013.01); *G06Q 30/0639* (2013.01); *H04W 4/021* (2013.01)

(56) References Cited

U.S. PATENT DOCUMENTS

| | | | |
|---|---|---|---|
| 2003/0103644 A1 | 6/2003 | Klayh | |
| 2004/0039661 A1* | 2/2004 | Fuzell-Casey | G06Q 30/02 705/26.81 |
| 2007/0088624 A1 | 4/2007 | Vaughn et al. | |
| 2007/0150375 A1* | 6/2007 | Yang | G06Q 10/08 705/339 |
| 2008/0065506 A1* | 3/2008 | Shillington | G06Q 30/0603 705/26.81 |
| 2008/0082424 A1* | 4/2008 | Walton | G06Q 10/047 705/26.1 |
| 2013/0215116 A1* | 8/2013 | Siddique | G06Q 30/0643 345/420 |

* cited by examiner

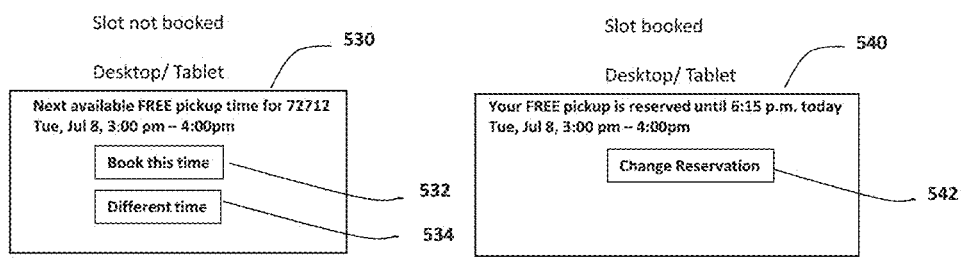
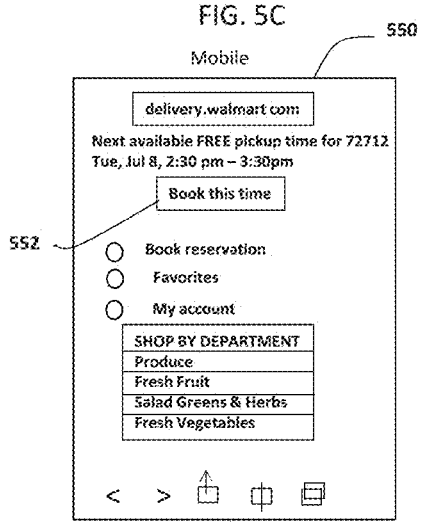
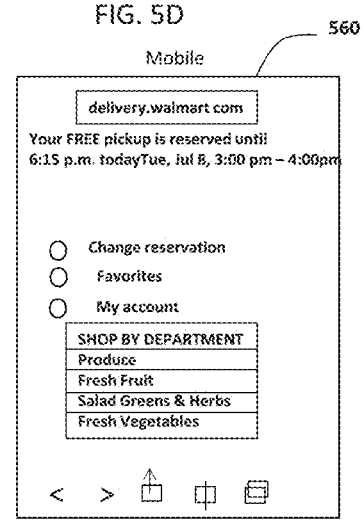
FIG. 5C
FIG. 5D
FIG. 5E
FIG. 5F

DELIVERY OF REMOTELY ORDERED ITEMS TO THE CURRENT LOCATION OF A USER WHEN GEOGRAPHIC INFORMATION INDICATES THAT THE USER IS WITHIN A PREDETERMINED AREA ASSOCIATED WITH A PHYSICAL STORE

CROSS-REFERENCE TO RELATED APPLICATION

This application claims the priority benefit under 35 U.S.C. § 119(e) of U.S. Provisional Patent Application No. 62/044,837, filed on Sep. 2, 2014, which is incorporated herein by reference in its entirety.

TECHNICAL FIELD

The present disclosure relates to methods and systems for fulfilling a remotely placed order.

BACKGROUND

In a traditional grocery store model, a wide variety of grocery and other items are maintained as inventory. The store contains a variety of shelves stocked with items that may be stored at ambient temperatures. For example, coolers store items to be maintained at a cool temperature, and freezers store frozen items. Many of these shelves are not in the same location. A customer would proceed through the store and select items to be purchased. However, the traditional grocery store is not particularly efficient for the customer to find a list of items.

Home delivery of a wide variety of grocery items and online ordered items is common. A customer may order items online via a website maintained by a merchant. Then, an employee of merchant may take the items and deliver to the customer. However, home delivery does not work well for items that cannot be left out due to temperature conditions. Further, waiting at home for an order to arrive can counter the benefit of saving the time for vesting the store.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 5C and 5D are diagrams of an example desktop or tablet screen for a one click appointment booking and confirmation of booking, respectively.

FIGS. 5E and 5F are diagrams of an example mobile display screen for a one click appointment booking and confirmation of appointment booking, respectively.

EXAMPLE

Detailed Description

Figure 1:
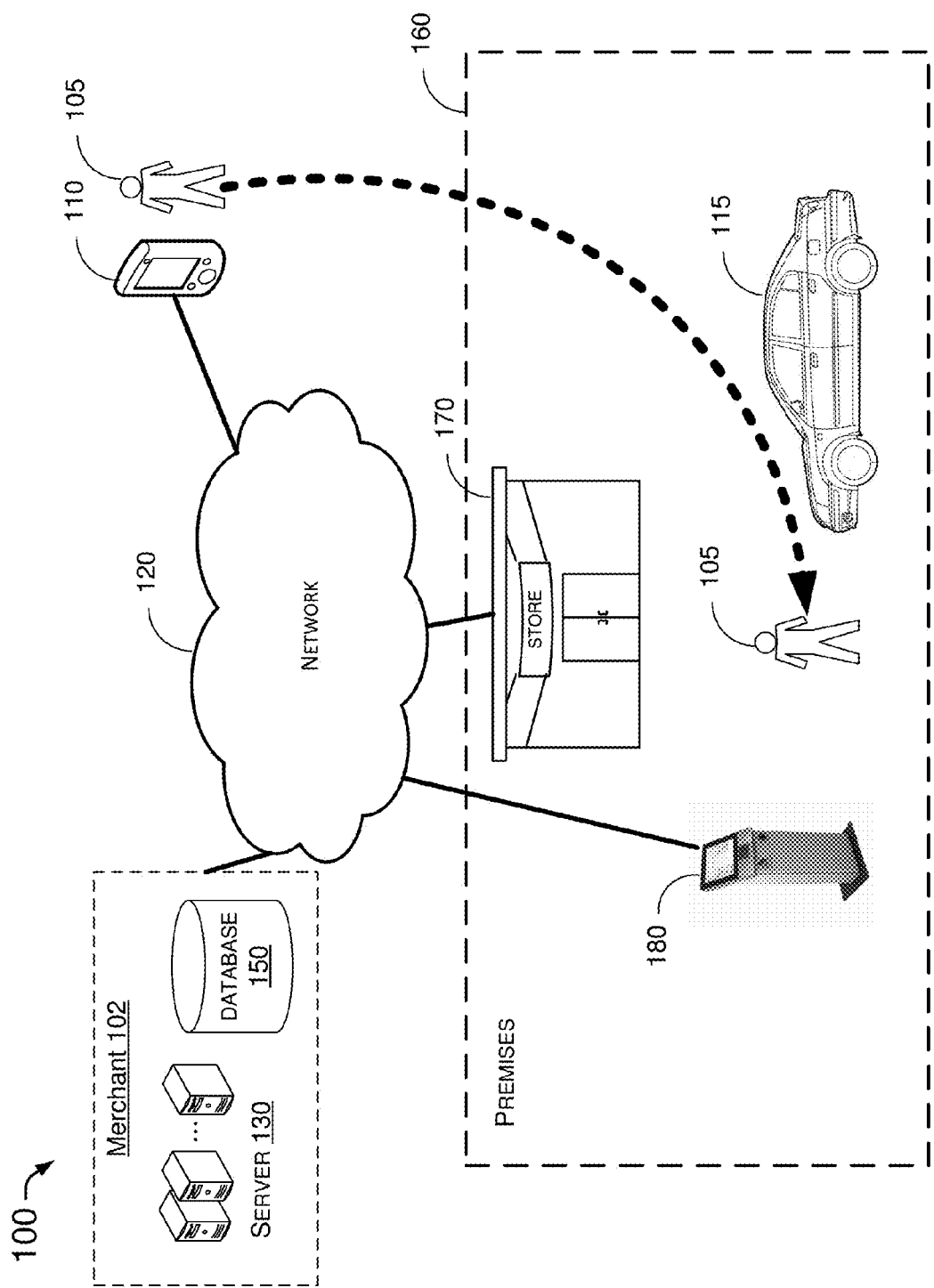
FIG. 1 is a diagram depicting an example computing environment in which example embodiments of the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one user. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware examples that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a diagram depicting an example computing environment 100 in which example embodiments may be implemented. In example computing environment 100, a merchant 102 operates a number of physical stores (including a physical store 170) to sell products and services. The merchant 102 may also allow online shopping of its products and services by online shoppers (herein interchangeably referred to as users), e.g., a user 105 using a user device 110, at an e-commerce website hosted on a web server via a network 120.

Example computing environment 100 may also include a server 130 in which embodiments of the present disclosure are implemented. That is, server 130 may be configured to allow users, e.g., user 105, to place a new order of one or more items or to add one or more items in addition to a pre-existing online order before picking up the online order at a physical store, e.g., physical store 170. Server 130 may be communicatively connected to a database 150 via network 120 or a local area network.

In some embodiments, database 150 may be an integral part of server 130. Database 150 may record, store or otherwise contain therein data associated with a set of products and/or services that are available for sale at the e-commerce website hosted on web server for pickup at one or more physical stores associated with merchant 102, including physical store 170. Database 150 may also record, store or otherwise contain therein data associated with a set of products and/or services that are available for sale at physical store 170.

Physical store 170 may be located at a location or premises 160 operated by, rented by, owned by or otherwise associated with merchant 102. As shown in FIG. 1, within premises 160 there is a kiosk 180. In some embodiments, kiosk 180 may be operated by or otherwise associated with merchant 102, and may be in a close proximity of physical store 170. Physical store 170 may include one or more computing devices (not shown) that are communicatively connected to network 120. User device 110, server 130, the one or more computing devices at physical store 170 and kiosk 180 may be communicatively connected to each other via network 120.

When user 105 places an online order, e.g., via user device 110, for one or more items at the e-commerce website of merchant 102, user 105 may select physical store 170, among a plurality of physical stores associated with merchant 102, as the desired store where user 105 plans to drive a car 115 and pick up the one or more items of the online order. The website may also request user 105 to enter a date and a time of the day as an estimated date/time for pickup of the one or more items of the online order.

In some embodiments, server 130 may receive geographic information about user 105. For example, server 130 may receive the geographic information by utilizing a Global Positioning system (GPS) on user device 110. The geographic information may indicate that user 105 is within a predetermined area associated with the physical store 170. The predetermined area may be determined based on a location of premises 160 or physical store 170. For example, the predetermined area may include premises 160. Server 130 may then determine whether there is a pending order for a user account associated with user 105 in database 150.

If there is a pending order for the user account, server 130 may transmit order information for the pending order to a local computing device of physical store 170. For example, the local computing device may include a computing device configured to facilitate packaging and delivering ordered one or more items. After store associates in physical store 170 pre-pick and package the ordered one or more items, server 130 may determine a current location of user 105 or car 115 and then cause a delivery of the ordered items to the current location. For example, server 130 may transmit a message to store associates of physical store 170 that instructs the store associates to deliver the ordered one or more items to the current location of user 105.

If there is not a pending order for the user account, server 130 may transmit advertisement information to user device 110. For example, server 130 may determine the advertisement information based on user data associated with user 105 and/or current promotion information associated with physical store 170.

Figure 2:
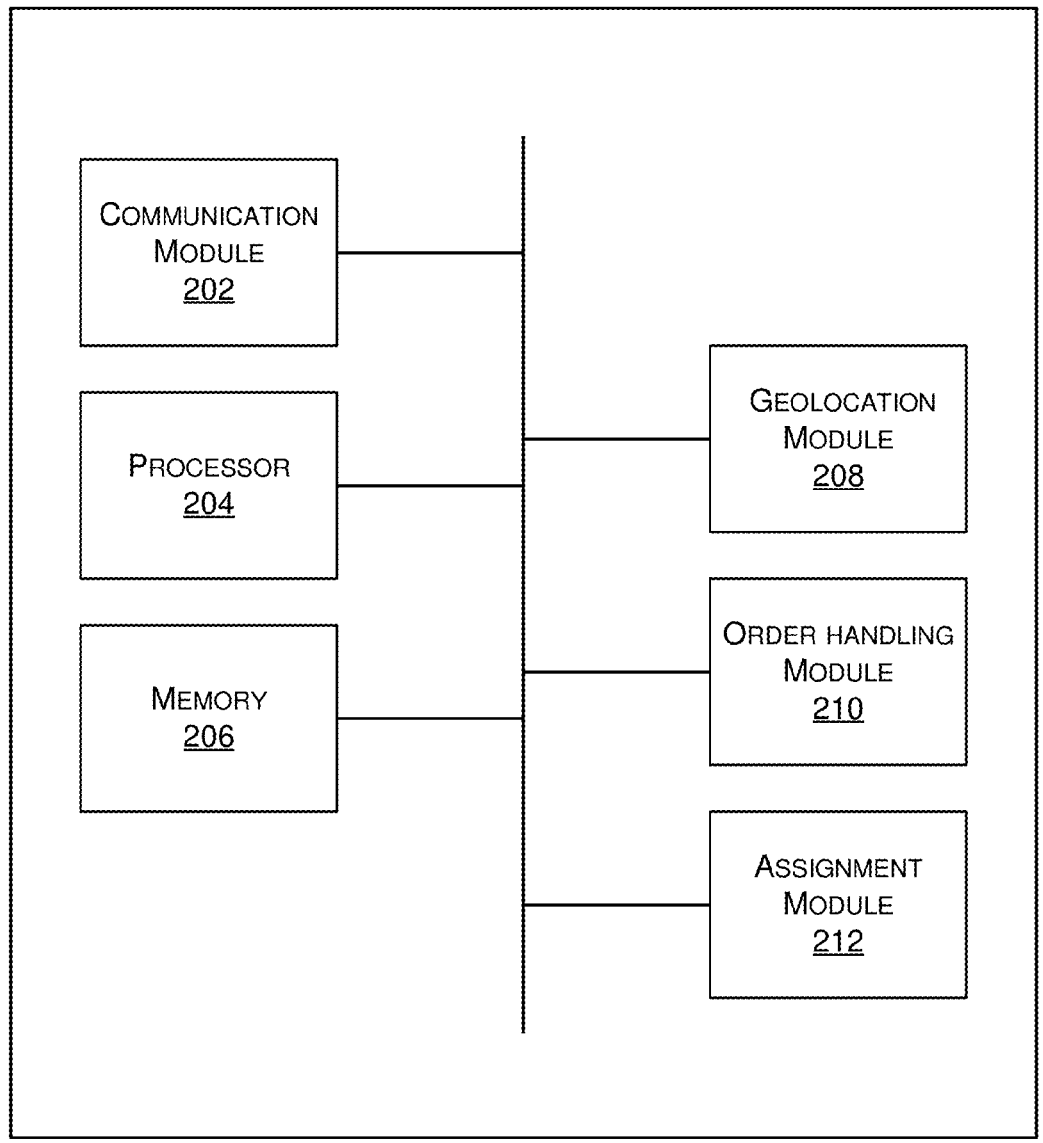
FIG. 2 is a block diagram depicting an embodiment of a server configured to fulfill a remotely placed order in accordance with the present disclosure.

FIG. 2 is a block diagram depicting an embodiment of a server 200 configured to implement example embodiments for fulfilling existing orders in accordance with the present disclosure. Server 200 may perform various functions related to embodiments of the present disclosure. In some embodiments, server 200 may be implemented in or as server 130 of FIG. 1. In some embodiments, server 200 may be implemented as one or more computing devices that cooperatively implement the functions described herein. Server 200 may include a communication module 202, one or more processors (shown as a processor 204 in FIG. 2), and a memory 206. Communication module 202 may allow server 200 to communicate with other networks, systems, servers, computing devices, etc. Processor 204 may execute one or more sets of instructions to implement the functionality provided by server 200. Memory 206 may store the one or more sets of instructions executable by processor 204 as well as other data used by processor 204.

Server 200 may also include a geolocation module 208, an order handling module 210, and an assignment module 212. Each of geolocation module 208, order handling module 210, and assignment module 212 may perform one or more functions under the control of processor 204. Although geolocation module 208, order handling module 210, and assignment module 212 are depicted in FIG. 2 as discrete modules separate from the processor 204, in various implementations one or more of geolocation module 208, order handling module 210, and assignment module 212 may be an integral part of processor 204. For simplicity, a task or function performed by any of geolocation module 208, order handling module 210, and assignment module 212 may be described as if such task or function is performed by processor 204.

Geolocation module 208 may be configured to receive geographic information about user 105. Geographic information may refer to user information and behavior that are relate to a geographic location of user 105. Geographic location refers to a relative location (e.g., Seattle, 1313 Disneyland Dr, Anaheim, Calif. 92802, etc.) as a displacement for another site or an absolute location using a coordinate system (e.g., a Spherical coordinate system or a world Geodetic system).

In some embodiments, geolocation module 208 may determine, based on the geographic information, that user 105 is within a predetermined area associated with physical store 170. In some instances, the predetermined area may be determined based on a location of premises 160 or a location of physical store 170. For example, the predetermined area may include premises 160.

In some embodiments, geolocation module 208 may obtain the geographic information in various methods. User 105 may provide the geographic information using user device 110. For example, user 105 may install an application on user device 110, and the application may monitor user behavior and collect geographic information by utilizing a GPS on user device 110. With the consent of user 105, the application may transmit the collected geographic information to server 130.

Order handling module 210 may be configured to determine whether there is a pending order for a user account associated with user 105 in database 150 after geolocation module 208 determines that user 105 is within the predetermined area. In these instances, order handling module 210 may transmit order information of the pending order to a local computing device of physical store 170.

The order information may include one or more items in the pending order. In some embodiments, the order information may further include at least one of a pickup time slot of the pending order, a customer order serial number (OSM) of the pending order, or a user identifier (ID) of user 105. The order information may further include user data associated with user 105.

User data may include a collection of records of user information and behavior that is, for example, associated with online and/or offline transaction. The user data may be obtained from store receipts, credit card purchases, mail-order requests, information inquiries, browsers, cookies, and other sources related to customer preferences or predisposition to purchasing or using an item. User online data refers to a collection of records of user online behavior related to, for example, user online preferences or predisposition to purchasing or using an item.

User preference data may include choices that user 105 has made with respect to interests (e.g., highly likes, partially likes, dislikes, etc.) of user 105. For example, the user preference data may include implicit and/or explicit information about user 105, the extent to which user 105 likes or dislikes one or more items.

The implicit and/or explicit information may be extracted from the user interaction with the system. For example, explicit information may be in form of ratings associated with the item, and implicit information may be generated by interpreting the user interaction data. For example, an online retailer website may infer that user 105 likes a product if she stays with the item page more than a predetermined time period. For example, user preference data may further include an acceptable substitution of the one or more items and/or an unacceptable substitution of the one or more items. In some embodiments, the profile database may contain a collection of organized user preference data for multiple users or one or more categories of users.

After receiving the order information, physical store 170 may start to pre-pick one or more items in the pending order. Order handling module 210 may transmit a message to user device 110 to notify user 105 of a delivery time of the pending order. For example, the message may indicate that the one or more items are delivered to a current location of user 105 within a predetermined time period.

Assignment module 212 may be configured to determine an assignment of the pending order based on a type or a size of the one or more items. For example, the assignment of the pending order may include an assignment for pre-picking of the one or more items to one or more employees of physical store 170 at one or more departments of physical store 170.

After geolocation module 208 determines the current location of user 105, order handling module 210 may cause a delivery the one or more items to the current location of user 105. For example, order handling module 210 may cause communication module 202 to transmit a message to one or more computing devices of physical store 170 to instruct store associates of physical store 170 to deliver the ordered one or more items to the current location of user 105. In some embodiments, physical store 170 may determine that an item of the one or more items is not in stock at physical store 170. In these instances, order handling module 210 may determine a substitute of the item based on the user preference data of user 105.

In some embodiments, order handling module 210 may receive a message indicating that an item of the one or more items is rejected or returned by user 105. In these instances, order handling module 210 may recalculate billing information of the pending order, and transmit the recalculated billing information to user device 110.

In some embodiments, order handling module 210 may determine that there is not a pending order for user 105. In these instances, order handling module 210 may further determine advertisement information of physical store 170 based on user data associated with user 105, and transmit the advertisement information to user device 110.

Figure 3:
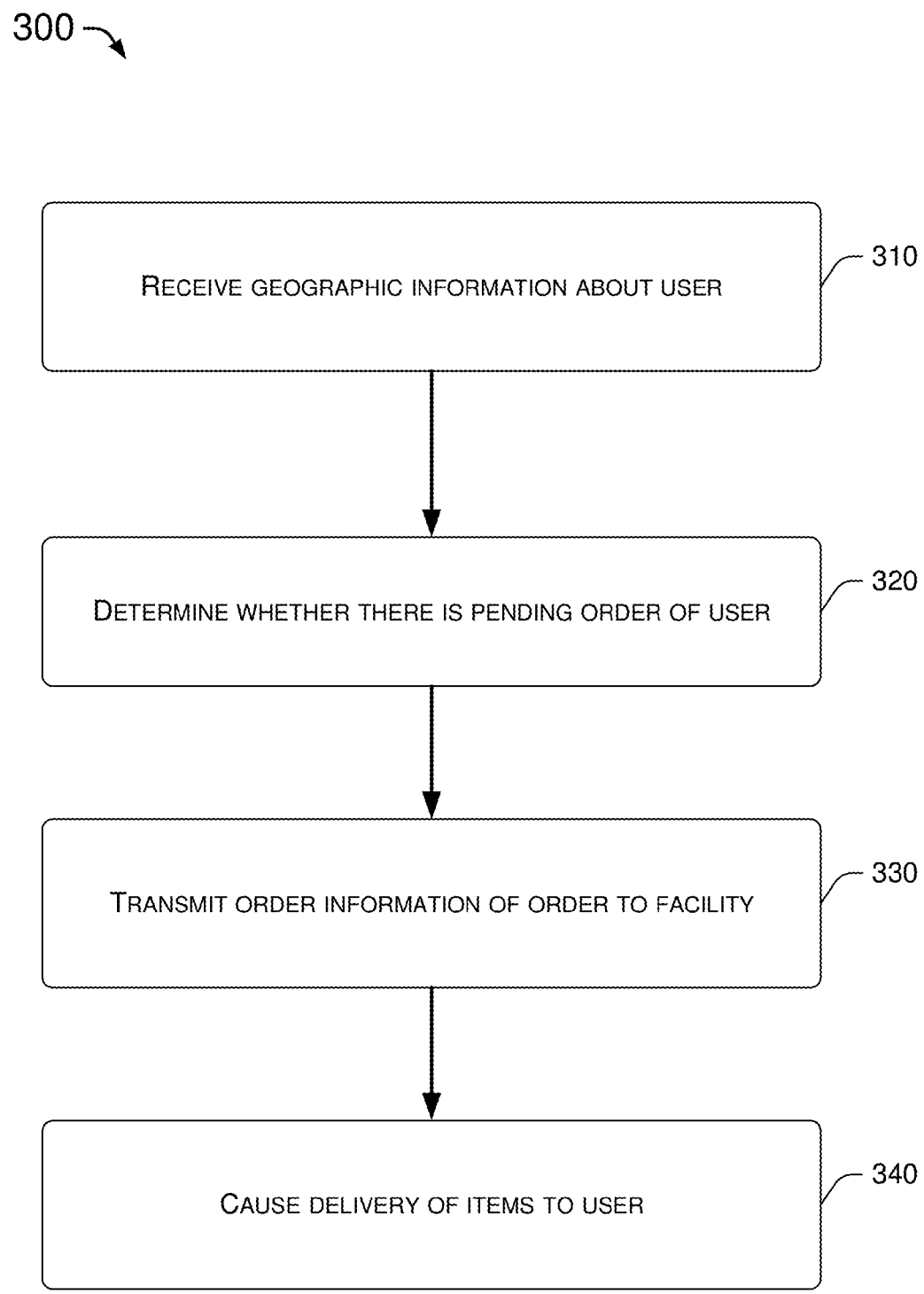
FIG. 3 is a flowchart diagram of an example process for fulfilling a remotely placed order in accordance with the present disclosure.

FIG. 3 is a flowchart diagram of an example process for fulfilling a remotely placed order. Example process 300 may include one or more operations, actions, or functions such as 310, 320, 330 and 340. Although illustrated as discrete blocks, various blocks may be divided into additional blocks, combined into fewer blocks, or eliminated, depending on the desired implementation. Example process 300 may be implemented by one or more processors including, for example, one or more processors of server 130 and/or server 200. For illustrative purposes, the operations described below are performed by one or more processors of server 130 and/or processor 204 of server 200. Each of server 130 and server 200 may be referred to as a computing device herein.

At 310, one or more processors of server 130 or server 200 may receive geographic information about user 105. For example, the geographic information may indicate that user 105 is within a predetermined area associated with physical store 170. The geographic information may be obtained by utilizing a GPS on a user device of the user or a sensor associated with kiosk 180 in premises 160.

At 320, the one or more processors of server 130 or server 200 may determine whether there is a pending remotely placed order for a user account associated with user 105 in database 150. The one or more processors of server 130 or server 200 may further transmit a message to user device 110 to notify user 105 that the one or more items are delivered to a current location of user 105 within a predetermined time period.

At 330, the one or more processors of server 130 or server 200 may transmit order information to a computing device of physical store 170 in response to a determination that there is the pending remotely placed order for the user account associated with user 105 in database 150. The order information may include one or more items in the pending remotely placed order.

At 340, the one or more processors of server 130 or server 200 may causing a delivery of the one or more items to a current location of user 105. In some embodiments, the one or more processors of server 130 or server 200 may determine that there is not a pending remotely placed order for the user account associated with user 105 in database 150. In these instances, the one or more processors of server 130 or server 200 may determine advertisement information of physical store 170 based on user data associated with user 105. The one or more processors of server 130 or server 200 may then transmit the advertisement information to user device 110.

Figure 4:
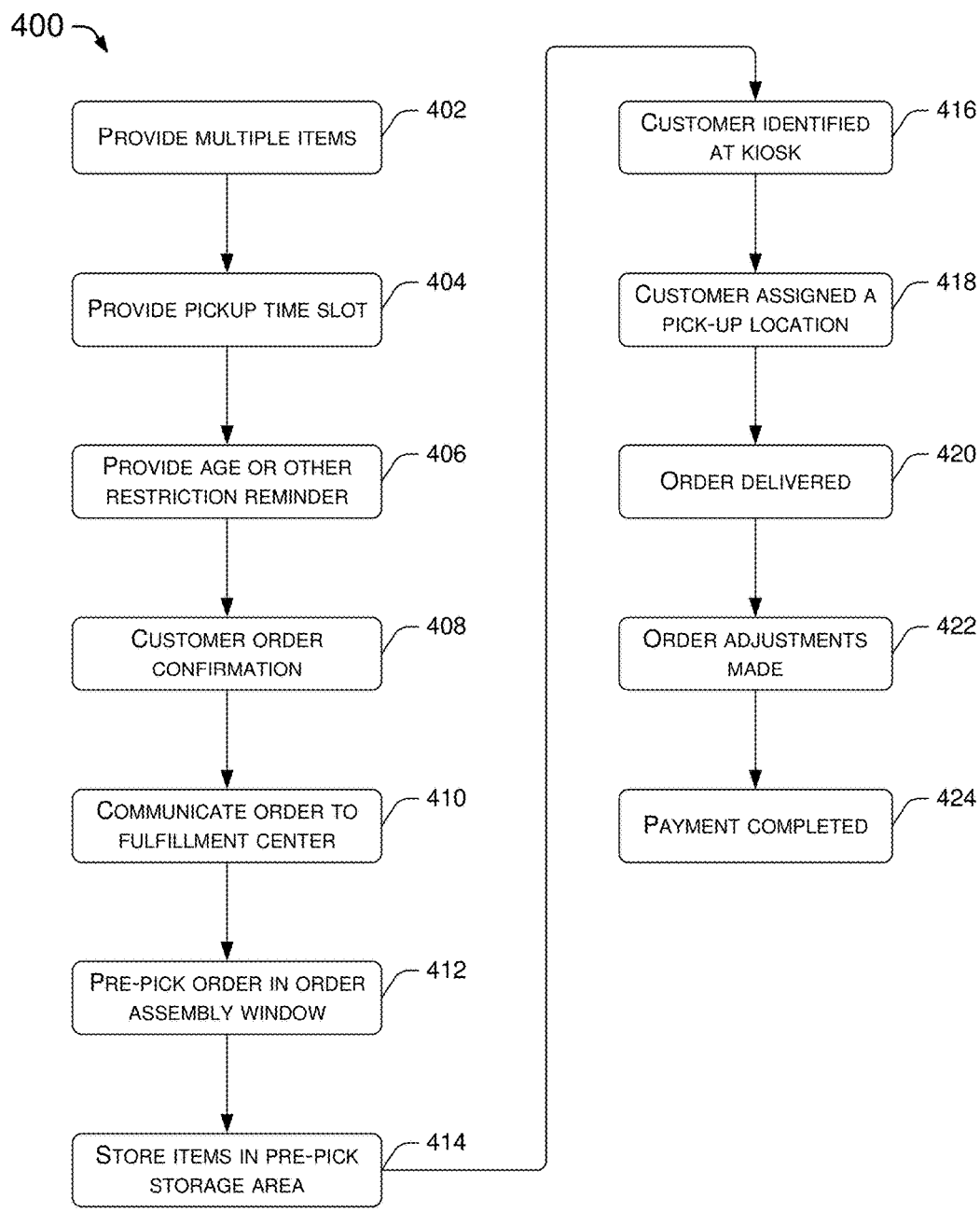
FIG. 4 is a flowchart diagram of an example process for a drive through grocery pickup.
Figure 5A:
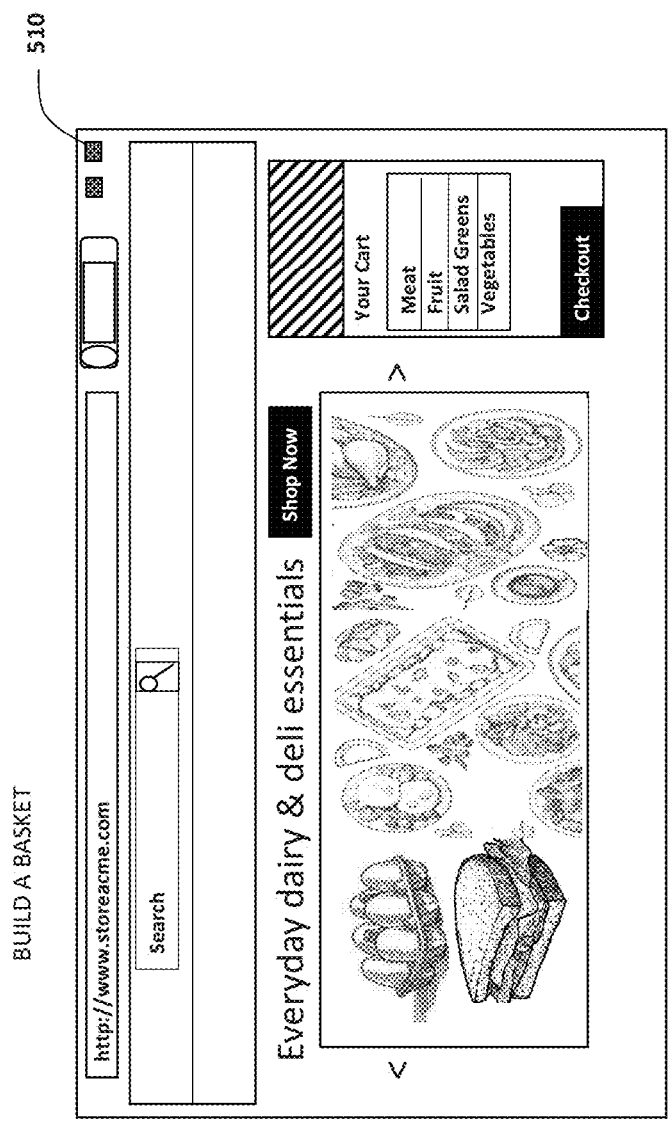
FIGS. 5A and 5B are diagrams of an example customer order screen for online ordering and a select a pick-up window for scheduling an order pickup, respectively.
Figure 5B:
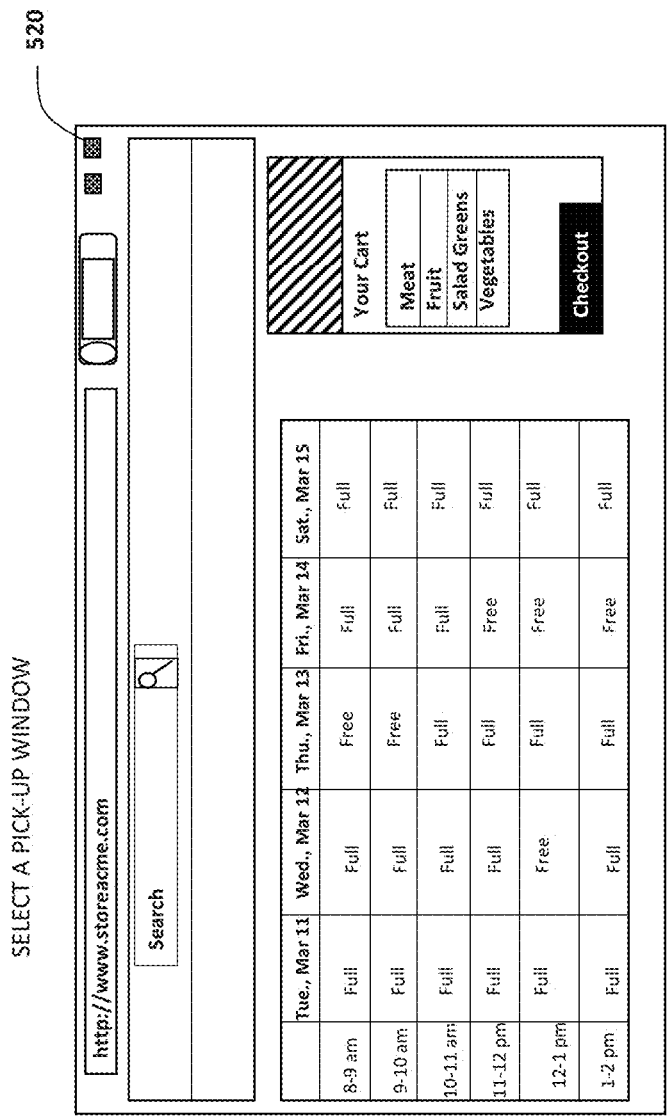

FIG. 4 is a flowchart diagram of an example process for a drive through grocery pickup. FIGS. 5A and 5B are diagrams of an example customer order screen for online ordering and a select a pick-up window for scheduling an order pickup, respectively. FIGS. 5C and 5D are diagrams of an example desktop or tablet screen for a one click appointment booking and confirmation of booking, respectively. FIGS. 5E and 5F are diagrams of an example mobile display screen for a one click appointment booking and confirmation of appointment booking, respectively. As seen in one example of the disclosure in FIG. 4, in drive through grocery pickup process 400, customers or users are provided a plurality of items for remotely placing an order in step 402. The plurality of items provided to the customer or user are determined by the plurality of items available at a hybrid order fulfillment center, which was pre-selected by the customer or user. In step 404, a plurality of pickup timeslots, at least one pickup timeslot for one click booking, is provided. Examples of an order screen 502 and pickup screen 504 are shown in FIGS. 5A and 5B, respectively. Preferably, the items and pickup timeslots are provided to a customer online using an ordering website, such as the Walmart to Go™ website adapted as addressed further herein or a mobile application downloaded to a smart phone, tablet, or the like.

Orders are preferably placed for pickup in a one hour pickup window no less than two hours after the order is placed subject to availability. While a customer may choose from a pick-up timeslot as illustrated in screen 520 of FIG. 5B, the present disclosure recognizes many customers will desire the convenience of taking the next available timeslot. To this end, a portion of a screen 530 of FIG. 5C is preferably generated to allow a customer to select the next available slot with one click booking of button 532. To book a different time, button 534 is clicked. Upon clicking button 532, a portion of a screen 540 is displayed on the customer interface confirming the appointment. Should the customer need or otherwise desire to change the pick-up timeslot, change reservation button 542 is clicked. A new portion of a screen 530 displays the next available slot at that time and the customer can select that slot by clicking button 532 or book a different time by clicking button 534. Exemplary screens 550 and 560 are shown in FIGS. 5E and 5F. A mobile using customer can click button 552 to select the next available slot.

In other examples of the disclosure, the two hour earlier period could be shortened based on order demand and customer flow experienced either during the hours of operation generally, or during particular periods when orders can be filled more quickly. Similarly, the pick-up window could be shortened or lengthened to a period less or greater than an hour based upon observations of timeliness of customer arrival.

In one example of the disclosure, an age or other restriction reminder is provided as in step 406. For example, for items such as alcohol, cigarettes or the like, the customer may be reminded he or she must be 21 and have photo identification to purchase such items. In another example of the disclosure, the customer-provided method of payment is authorized payment for the remotely placed order in step 408. Where a card is employed, the card is authorized but not charged for the full amount of the purchase. As such, the hybrid order fulfillment center does not need to include costly point of sale (POS) equipment, price look up (PLU) tables and related software, and many of its computing needs can be piggy backed on existing full service store or online computing systems substantially reducing costs. The customer is provided an email confirmation that the order has been placed along with their delivery time. Alternatively, a text message or other means of confirmation can be provided. The order is communicated to the customer order fulfillment center in step 410.

In one example of the disclosure shown in step 412, items of the remotely placed order are pre-picked from a plurality of storage areas following receipt of the remotely placed order. Item Pickers are directed pre-pick the plurality of items of the remotely placed order. Some of the items may be divided into sub-order to be pre-picked by a separate item picker in at least one of a plurality of the storage areas. The items are then stored in a plurality of pre-pick storage areas as shown in step 414. This process is preferably completed within the two hour time period prior to the selected pickup timeslot.

Figure 6:
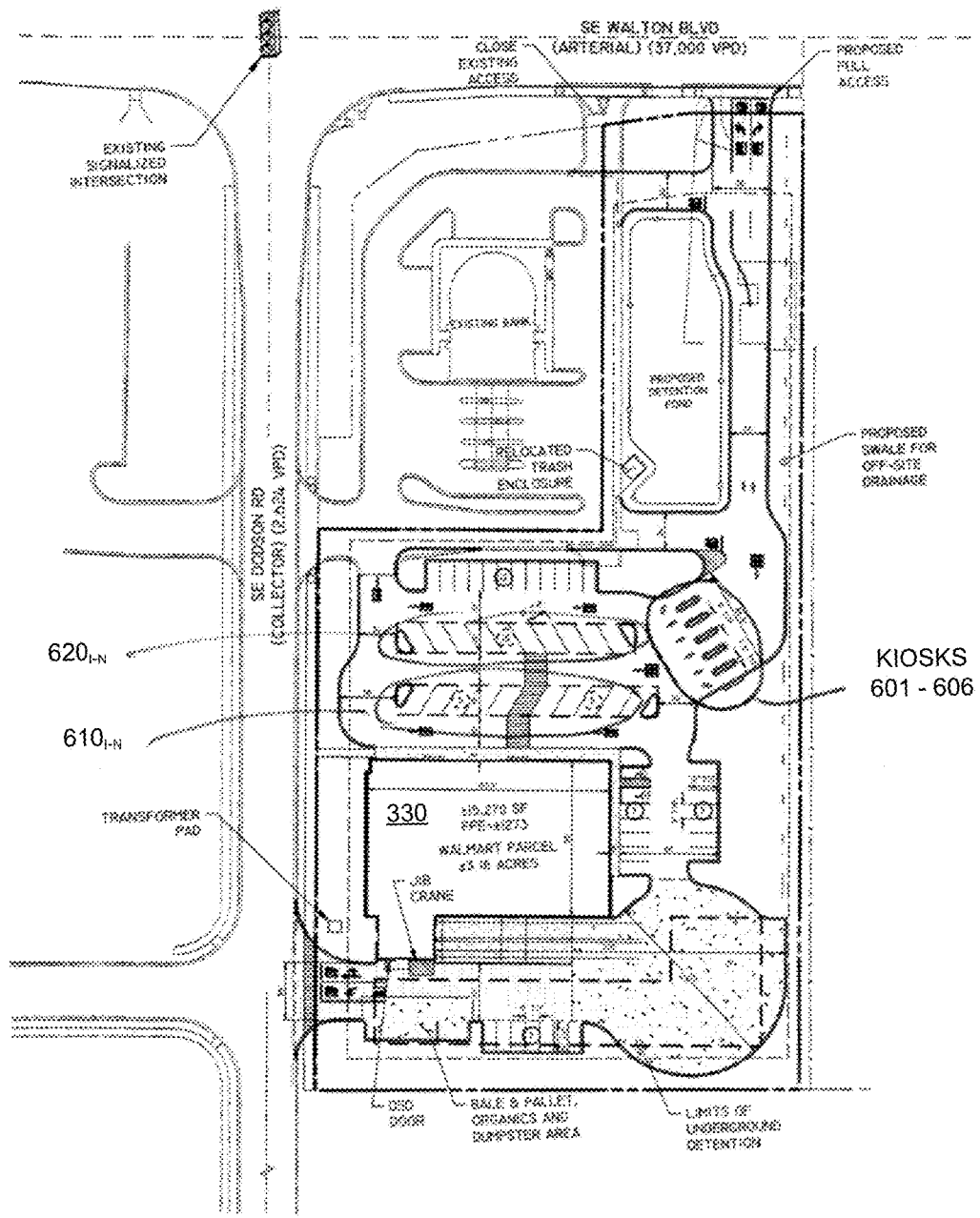
FIG. 6 is a diagram of an example store and parking site plan.
Figure 7A:
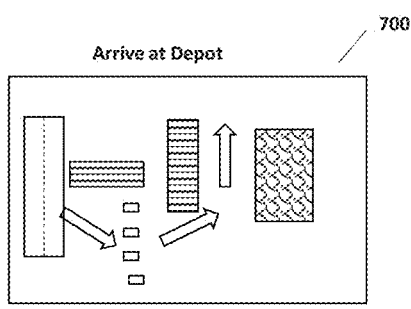
FIGS. 7A, 7B and 7C are diagrams of an example traffic flow of a check-in kiosk and order delivery to a customer vehicle parked close to a hybrid customer order fulfillment center, respectively.
Figure 7C:
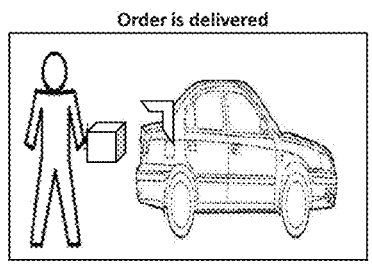
Figure 7B:
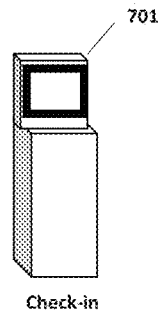

In one example of the disclosure, the customer is identified upon arrival at the hybrid order fulfillment center during the reserved pickup timeslot as in step 416. Upon arrival, the customer may be directed by signage, painted arrows on the roadway, or otherwise, to one of a plurality of identification devices, such as check-in kiosks. FIG. 6 is a diagram of an example store and parking site plan. FIGS. 7A, 7B and 7C are diagrams of an example traffic flow of a check-in kiosk and order delivery to a customer vehicle parked close to a hybrid customer order fulfillment center, respectively. As seen in FIG. 6, for example, six kiosks 601-606 may suitably be employed. An example traffic flow is shown in layout plan 700 of FIG. 7A. In step 416, the customer is identified either by last name first initial, order number, scanning a bar code on the email confirmation, swiping the credit card used to pay for the order, or the like. Further details of an exemplary check-in kiosk 401 suitable for use in FIG. 6 are shown in FIG. 7B. Upon identification and a determination of the corresponding remotely placed order, the customer is directed to a pickup location, such as one of the lanes 6101-n or 6201-n of FIG. 6, in step 418. This process 400 is all facilitated through a stand-alone hybrid order fulfillment center 630.

Figure 9:
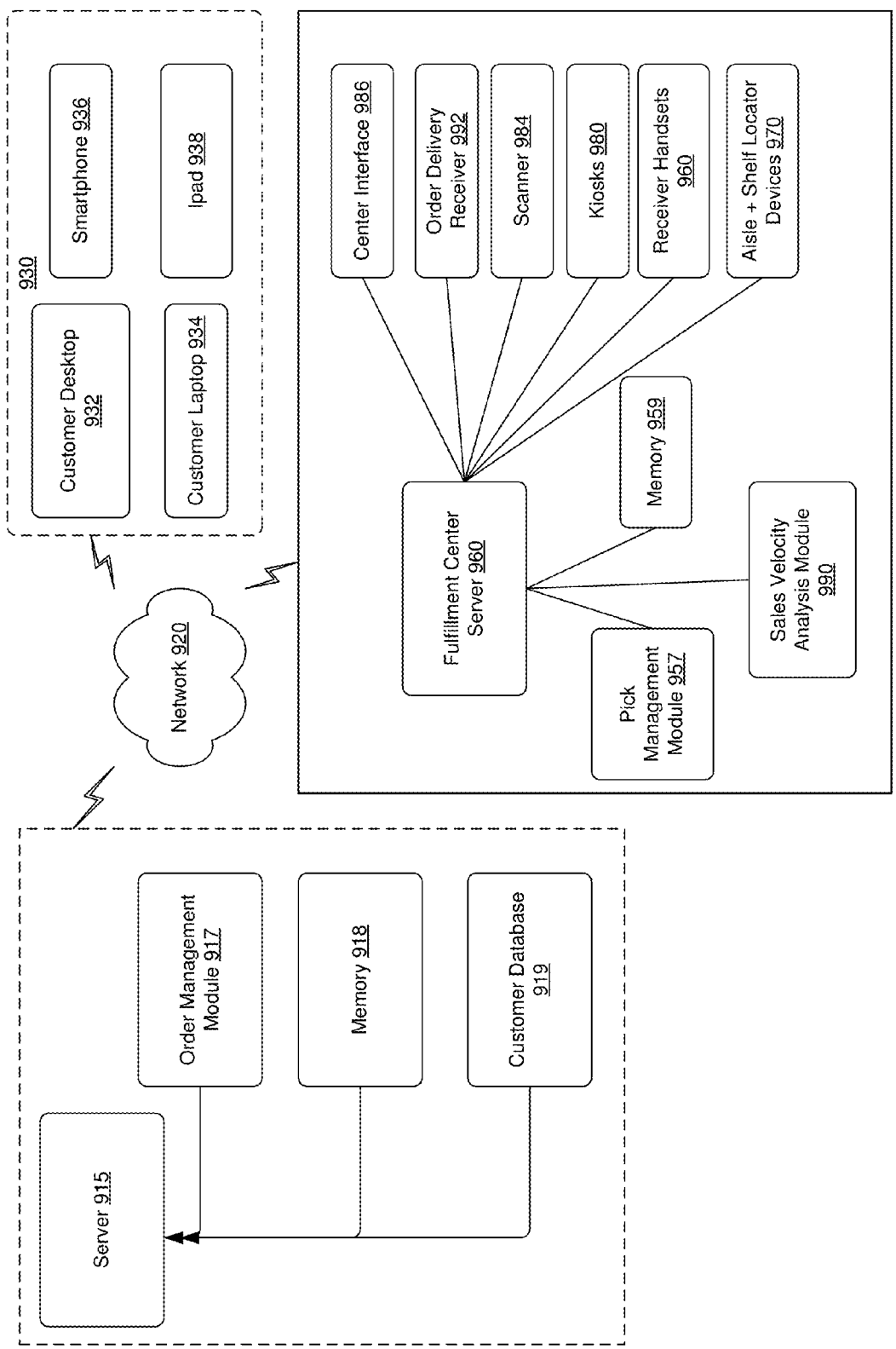
FIG. 9 is a diagram of an example a drive through pickup system.

In one example of the disclosure, an identification device, such as the kiosk 701, communicates with a center server, such as center server 955 of FIG. 9. The center server may determine if a customer has multiple orders so all the orders are brought to the vehicle. Multiple orders, for example, may result where a customer makes a first order in the morning for pickup on the way home from work and then realizing one or more additional items are needed, then places a second order anytime more than two hours before the scheduled pickup.

In another embodiment of the disclosure, a remotely placed order may also be split into sub-orders comprising ambient temperature items, cooler items, and freezer items each of which may be separately picked and set aside in an appropriate temperature storage area for assembly into the complete remotely placed order at the pickup timeslot as addressed further below in connection with FIG. 8.

In one example of the disclosure, the customer may follow traffic directing signage and parking lot striping, or similar markings, to the assigned pickup location, such as one of the slots 6101-n or 6201-n of FIG. 6. The customer may then pop the trunk for delivery as illustrated in FIG. 7C. In step 420, the pre-picked items are then delivered. Order deliverers are instructed of the customer's arrival and the location of the remotely placed order. Order deliverers then transport those items to the customer at the designated pickup location. The customer may be offered an opportunity to inspect certain items, such as produce or substitute items, with the option of accepting or rejecting those items as reflected in step 422. In that situation, the order deliverer updates the order if there are rejections. If alcohol or any other restricted items are on the order, the order deliverer verifies an identification, such as a driver's license, and enters any required verification information into an order delivery receiver. The order deliverer would then finalize payment of all items accepted by the customer as in step 424. Early and late arrivals may be pre-picked and delivered depending on a variety of factors such as customer flow, impact on other customer orders, and availability of pre-pick storage areas.

In one embodiment, on demand ordering at the hybrid order fulfillment center may be available, particularly during times when orders are being filled and delivered at less than maximum capacity so that resources exist to add a spur of the moment item or items. A further example of the present disclosure includes utilizing the hybrid order fulfillment center as a facility supplying low volume items to other smaller stores.

Figure 8:
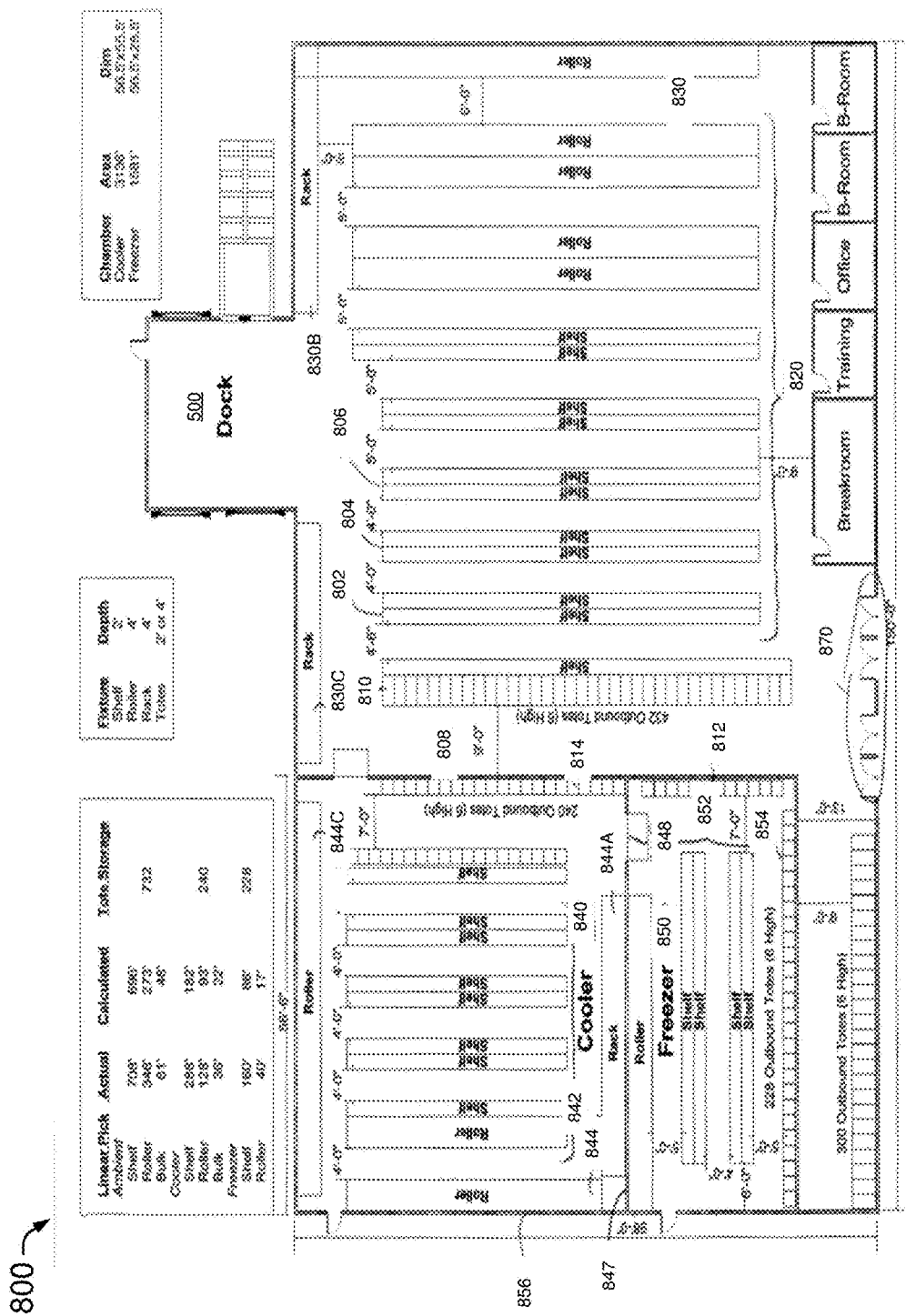
FIG. 8 is a diagram of an example hybrid order fulfillment center.

FIG. 8 is a diagram of an example hybrid order fulfillment center. One example of a physical layout of a hybrid order fulfillment center 800 is shown in FIG. 8. Hybrid order fulfillment center 800 stores product in a hybrid setting, in some respects analogous to a warehouse, with narrow 4' aisles, as seen between shelves 802 and 804 and 804 and 806, for example, but also with a 9' wide order assembly main aisle 508 between tote storage areas 810, 812, and 814, as addressed further below. As shown in FIG. 8, the hybrid order fulfillment center 800 is designed to speed pre-picking of customer orders, storing of pre-picked items pending pickup, and the rapid assembly and delivery of the order therefrom. Shelving 820 for items suitably stored at ambient temperature fill more than half of the floor space of FIG. 8. This shelving 820 is preferably adjustable without tools and movable to adapt to dynamic conditions of operation.

The hybrid customer order fulfillment center 800 preferably employs unique shelving not found in typical stores and not used in warehouses. This shelving is preferably flexible in that it can be adjusted by store associates without tools to add additional capacity for popular items while providing smaller capacity for less popular items. While a best initial determination is made as to which items to stock, even if that determination is initially perfect, the volumetric velocity of the sale of items will dynamically vary. The flexible shelving supports adjustments on an ongoing basis and an ongoing analysis of the dynamic volumetric velocity of sales as discussed further in connection with FIG. 10.

Fixed shelving 830A, 830B and 830C (collectively 830) extends around much of the walls of the hybrid order fulfillment center 800. This fixed shelving is preferably allocated to the highest volumetric velocity items stocked.

The hybrid order fulfillment center 800 also includes a cooler area 840 and a freezer area 850. In the presently preferred layout of FIG. 8, the cooler and freezer storage area have a combined area of approximately 5,000 square feet. The overall area of center 800 is approximately 15,000 square feet, plus the area of dock 860. Cooler area 840 includes movable adjustable shelving 842, as well as fixed shelving 844A, 844B, and 844C (collectively 844) arranged around its walls. Cooler area 840 has its associated pre-pick storage area 814. Freezer area 850 has movable, adjustable shelves 852, as well as fixed shelves 854, and an associated pre-pick storage area 812. In a presently preferred embodiment, the cooler area 840 is a single cooler compartment adjoining the freezer area 850, which is a single freezer compartment, separated therefrom by a wall 847 and having a connecting doorway 848. In the presently preferred layout of FIG. 8, one wall of the cooler 840 and the freezer 850 is external wall 856 of the hybrid order fulfillment center 800, and the ceiling of the cooler 840 and freezer 850 is part of the ceiling of the hybrid order fulfillment center 800. The pre-pickers can rapidly pass through the cooler 840 and freezer 850 to pre-pick cooler and freezer items from orders.

Products to be shelved in and sold from the hybrid order fulfillment center 800 are received at dock 860. Assembled customer orders are delivered through doors 870.

FIG. 9 is a diagram of an example of a drive through pickup system. FIG. 9 shows one embodiment of drive through grocery pickup system 900 in accordance with the present disclosure. As shown in FIG. 9, central server 915 which communicates utilizing Internet connections 920 with a customer interface displayed on customer devices 930. The customer devices 930 may suitably include laptop and customer desktop computers 932 and 934, smart phones 936 and other smart communication devices, including tablets and pads, such as iPads™ 938, and the like. While illustrative devices are shown, it will be recognized other devices with suitable processing, communication, display and data entry capacity may be employed. As addressed above, a plurality of grocery items and pickup timeslots, one pickup timeslot for one click booking, the selection determined by the availability at the pre-selected hybrid order fulfillment center. Center server 915 has an associated order management module 917, memory 918, and databases 919. The order management module is configured to create order display screens and pickup window schedule screens as appear on the customer interface, such as screens 510, 520, 530, 540, 550 and 560 of FIGS. 5A-5F, respectively.

The order management module causes central server 915 to communicate with fulfillment center server 955. More specifically, central server 915 communicates the plurality of items selected in the remotely placed order and the corresponding pickup timeslot to fulfillment system server 955 over the Internet 920, utilizing a dedicated communication channel or some combination thereof. Central server 915 also provides customer identification such as a name and a custom identification number paired with the remotely placed order. Additionally, customer preferences are communicated, such as: acceptable substitutions, substitutions which are unacceptable, that the customer does not want any substitutions, and so on.

With the customer order information, the fulfillment center server 955 employs a pick management module, configured to determine and provide efficient picking and storing instructions. As addressed above, an order including a small number of items may be assigned to a single pre-pick-associate. A larger order including ambient, cooler and freezer items may be assigned to two or three pre-pick associates with one pre-pick associate assigned ambient items, a second the cooler items and a third the freezer items. Pre-pick assignments are relayed to a picker device, such as picker head-sets 960 or aisle and shelf locator devices 970. The picked items may be placed in plastic shopping bags inside totes and the totes are placed in slots in pre-pick storage areas, such as areas 810, 812 and 814 of FIG. 8 with ambient items in an ambient area, such as area 810, freezer items in a freezer area, such as area 812, and cooler items in a cooler area, such as area 814. Upon placing a tote in a slot, the order corresponding to the tote and the slot are stored in memory, such as memory 959. For example, each slot may have a barcode as the tote is placed therein using the aisle and shelf locator device 970. Device 970 then transmits the order number and tote location to the store server 955. It will be recognized RFID tags or other approaches for identifying the tote slots may also be employed. In another example of the disclosure, the aisle and shelf locator device, such as a Motorola™ MC55, will advantageously be used to allow picking associates to quickly find products down to their shelf location and to restock items.

Upon arrival at the hybrid order fulfillment center, a customer is identified by an identification device such as a kiosk 980. Said identification device may also be some other device capable of tracking or identification such as a geolocator. The identification device, in communication with the fulfillment system server, then determines the corresponding remotely placed order and directs the customer to a particular pickup location. An alert is then sent to a center interface 686 alerting the order deliverer of a customer's arrival.

Through an order delivery receiver 982, upon entry of the customer order serial number (OSN) displayed on the center interface, an order deliverer is instructed on the location of the items of the remotely selected order in the pre-pick storage areas and the pick-up location of the customer for transport of the remotely placed order. The order delivery receiver also may have an attached scanner 984 for purposes of scanning items rejected by the customer upon delivery. For example, a bar code on a rejected item can be scanned and the fulfillment server 955 re-computes the price of the order and payment is completed.

Figure 10:
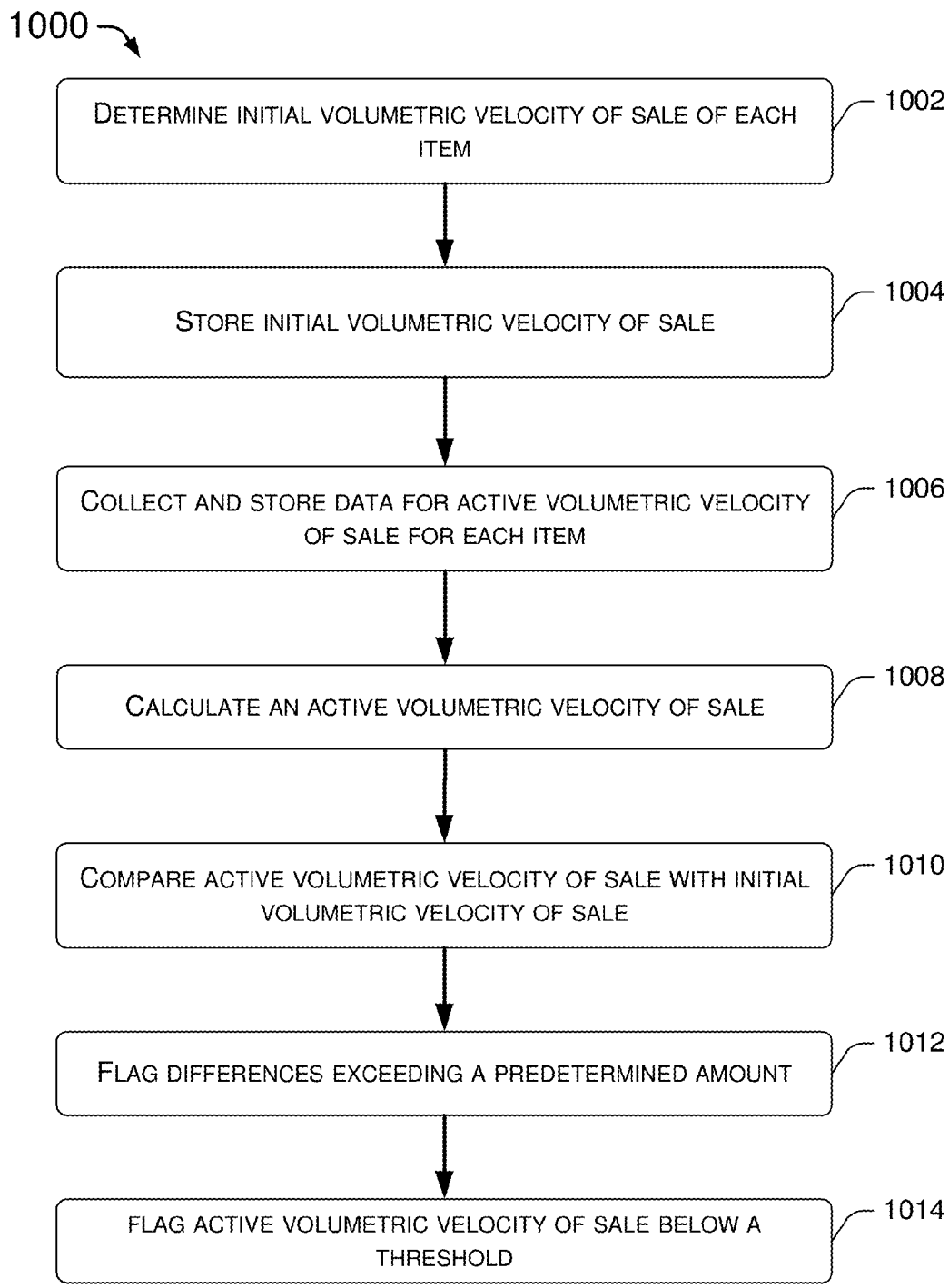
FIG. 10 is a flowchart diagram of an example process for dynamically evaluating volumetric velocity of sales of items sold by the hybrid order fulfillment center.

FIG. 10 is a flowchart diagram of an example process for dynamically evaluating volumetric velocity of sales of items sold by the hybrid order fulfillment center. FIG. 10 shows a process 1000 for dynamically analyzing the volumetric velocity of sales of a hybrid fulfillment center 800, which is performed by the sales module 990 in accordance with the present disclosure. In this context, volumetric sale of an item is the volume of the item multiplied by its velocity of sale over a predetermined period of time such as a typical restocking period of the hybrid fulfillment center, or some other period, such as a day, a week, or the like. In step 1002, an initial volumetric velocity of sale of each item sold by the hybrid fulfillment center 800 is determined. Shelf space or other storage therefore is allocated accordingly. The shelf location and other planogram data for the hybrid fulfillment center 800 are preferably stored in memory along with the initial volumetric velocity of sale value at 1004.

At 1006, data for the actual volumetric velocity of sale of each item is collected and stored. At 806, an actual volumetric velocity of sale of each item is calculated on a predetermined regular basis, such as daily, weekly, or the like.

At 1008, the actual volumetric velocity of sale of each item is compared with its initial value. At 1010, a difference between actual and initial exceeding a predetermined amount is flagged for evaluation.

The process 1000 loops back to step 1006 and a new actual volumetric velocity of sale of each item is calculated for a next predetermined period, and at 1008 is compared with the previous actual value, and so on. At 1012, analysis of the flagged differences may result in items being replaced and allocated space or storage being adjusted upwardly or downwardly, and the like. Additionally, at 1014, actual volumetric velocity of sales below a certain threshold are flagged.

In view of the above, a summary of select embodiments of the present disclosure is provided below.

In one example, a method of fulfilling a remotely placed order may include: receiving a remotely placed order of at least one of a plurality of items; receiving a selection of a pickup timeslot chosen from a plurality of pickup timeslots available at a pre-selected hybrid order fulfillment center; pre-picking the at least one of a plurality of items of the remotely placed order at the hybrid order fulfillment center; storing the at least one of a plurality of items of the remotely placed order at the hybrid order fulfillment center in at least one of a pre-pick storage area; and delivering to a customer the at least one of a plurality of items of the remotely placed order of the same customer at the hybrid order fulfillment center.

In some embodiments, prior to receiving the remotely placed order, a determination of the availability of the at least one of a plurality of items may be made at the pre-selected hybrid order fulfillment center.

In some embodiments, prior to receiving the remotely placed order, at least one of a plurality of pickup timeslots may be available for one click booking.

In some embodiments, the plurality of pickup timeslots may be determined by the availability of a plurality of pickup timeslots at the pre-selected hybrid order fulfillment center.

In some embodiments, prior to receiving the remotely placed order, a method of payment for the remotely placed order may be pre-authorized.

In some embodiments, in receiving a remotely placed order, the method may further include communicating the remotely placed order of at least one of a plurality of items to the pre-selected hybrid order fulfillment center.

In some embodiments, in pre-picking the remotely placed order, the method may further include directing one or more item pickers to pre-pick the remote selection of at least one of a plurality of items of the remotely placed order at the hybrid order fulfillment center.

In some embodiments, the method may further include dividing at least two of the plurality of items of the remotely selected order into sub-orders pre-picked by a separate item picker in at least one of a plurality of storage areas.

In some embodiments, in delivering to a customer the remotely placed order, the method may further include identifying a customer upon arrival at the hybrid order fulfillment center.

In some embodiments, the method may further include determining the corresponding remotely placed order of at least one of a plurality of items and the pick-up timeslot to the customer identified upon arrival at the hybrid order fulfillment center.

In some embodiments, the method may further include directing the customer to a particular pickup location at the hybrid order fulfillment center for receiving their remotely placed order.

In some embodiments, the method may further include instructing one or more order deliverers where the at least one of a plurality of items of the remotely selected order is located in the one or more pre-pick storage areas and the pick-up location of the customer.

In some embodiments, the method may further include transporting the at least one of a plurality of items of the remotely selected order from the pre-pick storage areas to the customer at the particular pickup location.

In some embodiments, the method may further include finalizing payment of all items accepted by the customer at the hybrid order fulfillment center.

In another example, a hybrid order fulfillment center may include: an ambient storage area for storing a selection of items requiring ambient temperature storage; a first pre-pick storage area storing pre-picked ambient temperature items adjacent the ambient storage area; a cooler storage area for storing a selection of items requiring cooler storage; a second pre-pick storage area within the cooler storage area storing pre-picked items from the cooler storage area; a freezer storage area having a third selection of items requiring freezer storage; and a third pre-pick storage area within the freezer storage area storing pre-picked items from the freezer storage area.

In some embodiments, the hybrid order fulfillment center may further include flexible shelving to adapt to changes in inventory of items at the hybrid order fulfillment center.

In some embodiments, the cooler storage area and the freezer storage area may be adjacent one another and share a common interior wall of the hybrid order fulfillment center.

In some embodiments, the cooler storage area and the freezer storage area may share a common external wall of the hybrid order fulfillment center.

In some embodiments, the cooler storage area and the freezer storage area may share a common side arranged across a main aisle separating the cooler storage area and the freezer storage area from a substantial bulk of the ambient storage area.

In some embodiments, the first, second, and third pre-pick storage areas may be arranged beside the main aisle.

In some embodiments, the selection of items may be determined by volumetric velocity of sale of the items.

In another example, a system of fulfilling a remotely placed order for at least one of a plurality of items may include: a picker device, configured to provide instructions to one or more users regarding pre-picking and storing at least one of a plurality of items of a remotely placed order at a pre-selected hybrid order fulfillment center; an order delivery receiver, configured to receive and provide instructions to one or more users regarding delivering at least one of a plurality of items of a remotely placed order; and a fulfillment center server, configured to receive at least one remotely placed order of at least one of a plurality of items and a selection of a pick-up timeslot and configured to communicate with the picker device and order delivery receiver. The fulfillment center server may include: a pick management module, configured to determine efficient pre-picking and storing instructions based on at least one received remotely placed order of at least one of a plurality of items and a pickup timeslot at the hybrid order fulfillment center; a memory, configured to store availability and location of the plurality of items at the hybrid order fulfillment center; and a database coupled to the memory.

In some embodiments, the system may further include: a customer interface, configured to provide a plurality of items for remotely placing an order and a plurality of pickup timeslots, at least one of the pick-up timeslots for one click booking; and a central server, configured to communicate via the network with the customer interface and at least one fulfillment center server. The central server may include: an order management module, configured to display orders and pickup schedules on the customer interface; a database; and a memory coupled to the database.

In some embodiments, the system may further include a locator device, configured to identify items located on shelves or aisles of the hybrid order fulfillment center and to send that location to the fulfillment center server.

In some embodiments, the system may further include a center interface, configured to receive and display alerts regarding a customer's arrival.

In some embodiments, the system may further include an identification device configured to: identify a customer upon arrival at the hybrid order fulfillment center; determine the corresponding remotely placed order of at least one of a plurality of Items and the pick-up timeslot to the customer identified upon arrival; direct the customer to a particular pickup location at the hybrid order fulfillment center for delivery of their remotely placed order; and send an alert regarding a customer's arrival to the center interface.

In some embodiments, the order delivery receiver may be further configured to: instruct one or more order deliverers where the at least one of a plurality of items of the remotely selected order is located in one or more pre-pick storage areas and a pickup location of the customer; instruct the one or more order deliverers to transport the at least one of a plurality of items of the remotely selected order from the pre-pick storage areas to the customer at the particular pickup location; and instruct the one or more order deliverers to complete payment of all items accepted by the customer at the hybrid order fulfillment center.

In some embodiments, the system may further include a scanner configured to scan items rejected by the customer upon delivery at the hybrid order fulfillment center.

In some embodiments, the center server may further include a sales module configured to determine volumetric velocity of sales at the hybrid order fulfillment center.

While the present disclosure is disclosed in the context of a presently preferred embodiment, it will be recognized that a wide variety of implementations may be employed by persons of ordinary skill in the art consistent with the above discussion and the claims which follow below. For example, while a hybrid order fulfillment center for approximately 10,000 different SKUs is illustrated, it will be understood that more or less items may be stocked consistent with the teachings herein. Further, while exemplary shelving arrangements are shown herein, it will be recognized that other arrangements may be adapted to suit the particular context and environment in which the disclosure is employed as flexibility is one of the hallmarks of the present disclosure.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
executing at a computer display screen an online order for one or more items at an e-commerce website, comprising:
displaying by the computer display screen an order screen provided by the e-commerce website for selecting the one or more items; and
communicating an order for the one or more items from the computer display screen to an order fulfillment center computer;
the method further comprising:
receiving, by one or more processors of a server associated with a physical store communicating with at least one of a mobile electronic device of a user or the order fulfillment center computer, geographic information about the user, the geographic information indicating that the user is within a predetermined area associated with the physical store;
determining, by the one or more processors, whether there is a pending remotely placed online order for a user account associated with the user in a database associated with the physical store;
in a first response to determining whether there is the pending remotely placed online order from the e-commerce website for the user account associated with the user in the database, automatically transmitting, by the one or more processors, order information to a computing device of the physical store, the order information comprising the one or more items in the pending remotely placed order;
determining, by the one or more processors communicating with the mobile electronic device of the user, a current location of the user; and
causing, by the one or more processors, a delivery of the one or more items to the current location for pickup by the user.

2. The method of claim 1, further comprising:
transmitting, by the one or more processors, a message to a user device of the user, the message indicating that the one or more items are delivered to the current location within a predetermined time period.

3. The method of claim 1, wherein the receiving the geographic information about the user comprises at least one of:
receiving the geographic information based on a user input;
receiving the geographic information by utilizing a Global Positioning System (GPS) on a user device of the user; or
receiving the geographic information from a sensor in the predetermined area.

4. The method of claim 1, further comprising:
determining an assignment of the pending remotely placed order based on a type or a size of the one or more items, the assignment of the pending remotely placed order including an assignment for pre-picking of the one or more items.

5. The method of claim 1, wherein the order information further comprises at least one of the pickup time slot of the pending remotely placed order, a customer order serial number (OSM) of the pending remotely place order, or a user identifier (ID) of the user or the user account.

6. The method of claim 1, wherein the order information further includes a user preference of the user, the user preference indicating an acceptable substitution of the one or more items or an unacceptable substitution of the one or more items, or a combination thereof.

7. The method of claim 6, further comprising:
determining availability of an item of the one or more items; and
determining a substitution of the item based on the user preference.

8. The method of claim 1, further comprising:
in a second response to the step of determining whether there is a pending remotely placed order for the user account associated with the user in the database, determining advertisement information of the physical store based on a user online record, a user offline record, or a combination thereof; and
transmitting the advertisement information to a user device of the user.

9. The method of claim 1, further comprising:
receiving a message from an additional computing device of the physical store, the message indicating a rejection or return of an item of the one or more items;
in response to receiving the message, recalculating billing information of the pending remotely placed order; and
notifying the user of the recalculated billing information.

10. One or more non-transitory computer-readable media storing a computer-executable instruction that, when executed by one or more processors, causes the one or more processors to perform operations comprising:
executing at a computer display screen an online order for one or more items at an e-commerce website, comprising:
displaying by the computer display screen an order screen provided by the e-commerce website for selecting the one or more items; and communicating an order for the one or more items from the computer display screen to an order fulfillment center computer;
receiving geographic information about a user from a user device associated with the user, the geographic information indicating that the user is within a predetermined area associated with a physical store communicating with at least one of a mobile electronic device of a user or the order fulfillment center computer;
determining whether there is a pending remotely placed online order for a user account associated with the user in a database associated with the physical store;
in a first response to determining whether there is the pending remotely placed online order from the e-commerce website for the user account associated with the user in the database:
  automatically transmitting, by the one or more processors, order information to a computing device of the physical store, the order information comprising the one or more items in the pending remotely placed order,
  determining, by the one or more processors, a current location of the user, and
causing, by the one or more processors communicating with the mobile electronic device of the user, a delivery of the one or more items to the current location; and
in a second response to the step of determining whether there is a pending remotely placed order for the user account associated with the user in the database:
  determining advertisement information of the physical store based on a user online record, a user offline record, or a combination thereof, and
  transmitting the advertisement information to a user device of the user.

11. The one or more non-transitory computer-readable media of claim 10, wherein the order information further comprises at least one of a pickup time slot of the pending remotely placed order, a customer order serial number (OSM) of the pending remotely place order, or a user identifier (ID) of the user or the user account.

12. The one or more non-transitory computer-readable media of claim 10, wherein the order information further includes a user preference of the user, the user preference indicating an acceptable substitution of the one or more items or an unacceptable substitution of the one or more items, or a combination thereof.

13. The one or more non-transitory computer-readable media of claim 12, wherein the operations further comprise: determining availability of an item of the one or more items; and determining a substitution of the item based on the user preference.

14. The one or more non-transitory computer-readable media of claim 10, wherein the operations further comprise:
receiving a message from an additional computing device of the physical store, the message indicating a rejection or return of an item of the one or more items;
in response to receiving the message, recalculating billing information of the pending remotely placed order; and
notifying the user of the recalculated billing information.

15. An apparatus, comprising:
a computer display screen that displays an order screen provided by an e-commerce website for selecting one or more items; and
a memory configured to store one or more sets of instructions;
a processor configured to access the memory to execute the one or more sets of instructions to perform operations comprising:
  receiving geographic information about a user, the geographic information indicating that the user is within a predetermined area associated with a physical store;
  receiving an order communicated by the display screen for the one or more items from the computer display screen to an order fulfillment center computer;
  determining whether there is a pending remotely placed order for a user account associated with the user in a database associated with the physical store;
  in a first response to determining whether there is the pending remotely placed online order for from the e-commerce website the user account associated with the user in the database, automatically transmitting order information to a computing device of the physical store, the order information comprising the one or more items in the pending remotely placed order;
  determining a current location of the user; and
  causing a delivery of the one or more items to the current location for pickup by the user.

16. The apparatus of claim 15, wherein the operations further comprise:
in a second response to the step of determining whether there is a remotely placed order for the user account associated with the user in the database, determining advertisement information of the physical store based on a user online record, a user offline record, or a combination thereof; and
transmitting the advertisement information to a user device of the user.

17. The apparatus of claim 15, wherein the operations further comprise:
receiving a message from an additional computing device of the physical store, the message indicating a rejection or return of an item of the one or more items;
in response to receiving the message, recalculating billing information of the pending remotely placed order; and
notifying the user of the recalculated billing information.

18. The apparatus of claim 15, wherein the receiving the geographic information about the user comprises receiving the geographic information by utilizing a GPS in a user device of the user.

19. The apparatus of claim 15, wherein the order information further includes a user preference of the user, the user preference indicating an acceptable substitution of the one or more items or an unacceptable substitution of the one or more items, or a combination thereof.

20. The apparatus of claim 19, wherein the operations further comprise:
determining availability of an item of the one or more items; and
determining a substitution of the item based on the user preference.

* * * * *